Jan. 23, 1968

P. J. WOOD

Re. 26,339

CAN WRAPPER

Original Filed Aug. 9, 1963

INVENTOR.
PRENTICE J. WOOD
BY Walter M. Rodgers
ATTORNEY

United States Patent Office

Re. 26,339
Reissued Jan. 23, 1968

26,339
CAN WRAPPER

Prentice J. Wood, Jonesboro, Ga., assignor to The Mead Corporation, a corporation of Ohio Original No. 3,156,404, dated Nov. 10, 1964, Ser. No. 301,155, Aug. 9, 1963. Application for reissue July 1, 1966, Ser. No. 570,106
13 Claims. (Cl. 229—40)

Matter enclosed in heavy brackets [ ] appears in the original patent but forms no part of this reissue specification; matter printed in italics indicates the additions made by reissue.

*ABSTRACT OF THE DISCLOSURE*

*An open-end sleeve-type carrier formed from a unitary blank encloses at least one row of cylindrical objects such* as chimed cans and is provided with tab structures on at *least one wall parallel to the ends of the packaged items each of which includes a main portion and a web portion, the web portion being foldably joined to the main portion and to the associated wall so as to bias the tab inwardly of the wrapper and toward engagement with the recessed end of an adjacent packaged item so as to hold the item against dislodgment through the open ends of the carrier.*

Figure 1:
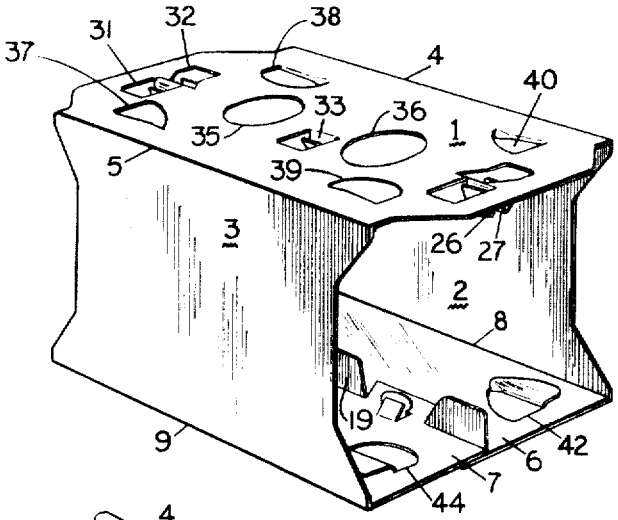

This invention relates to can wrappers and more particularly to an improved can retaining tab adapted to engage the chimes of packaged cans so as to prevent dislodgement thereof through the open ends of the wrapper. Preferably the improved retaining tab of this invention is utilized in a wrapper having top and bottom wall panels which are longer than the side wall panels and whose end edges are configured in a fashion which is complementary to the configuration of the end edges of the side walls. By this arrangement substantial economies are effected due to the fact that a blank may be nested with an adjacent blank when being die cut from a sheet of material from which the blank is formed. Not only is economy effected by this particular procedure but the top and bottom panels in which the retaining tabs are formed are substantially strengthened with material which in effect is taken from the side walls of an adjacent wraper where such material is not needed for strength. In addition, a center keel tab is formed which is peculiarly adapted to hold the bottom panel and its center keel in close contact with at least two of the cans one of which is disposed on one side of the keel and the other which is on the other side of the keel.

Can wrapers constructed in accordance with the invention disclosed and claimed in U.S. Patent 2,786,572 perform a highly satisfactory packaging operation and in addition provide a substantial area on which advertising space may be imprinted. The cans are held within the wrapper of Patent 2,786,572 by slits formed at the corners of the package which receive the chimes of the packaged cans. Thus, in a wrapper of this type the package group must be almost completely surrounded by the material forming the wrapper.

In order to effect economy of material, it is sometimes the practice to shorten the wrapper substantially and thus to allow substantial portions of the cans at each end of the wrapper to extend beyond the edges of the wrapper. When such an arrangement is utilized it is not possible to hold the cans within the wrapper by slits as disclosed in the above Patent 2,786,572. It has thus been the practice to resort to various holding elements such as tabs which engage the recessed tops and bottoms of the packaged cans and which ordinarily are formed in the top and bottom of the wrapper. To insure that such tabs are held securely in engagement with the tops and bottoms of the packaged cans, it is present practice to hold the top and bottom panels against the ends of the packaged cans by medial chime engaging tabs struck out of the top and bottom panels and doubled back on themselves. Such tabs tend to weaken the top and bottom panels near the end edges thereof.

A principal object of this invention is to provide an improved can retaining tab of relatively small area which is so constructed that secure and positive can gripping action is provided.

Another object of this invention is the provision of a retaining tab which is especially adapted to provide secure and effective can retaining action and the orientation of which is not limited to any particular angular disposition of its fold line and which is effective irrespective of the direction in which the tab is folded.

A further object of the invention is to provide an improved can wrapper with medial chime engaging tabs struck therefrom and doubled back on themselves for holding the panel in contacting engagement with the can ends and at least one panel of which is provided in which such panel is somewhat longer than the adjacent panels so as to add materially to the strength thereof, such elongated panel such as the top panel being provided by utilizing material taken from the ends of adjacent panels such as the side wall panels of adjacent nested blanks cut from a common sheet of material from which the wrappers are formed.

Still another object of the invention is the provision of an improved keel tab which is specially arranged so as to hold the bottom panel closely adjacent the bottom ends of the packaged cans.

The invention in one form comprises a can retaining tab adapted to be struck from the top or bottom panels of a can wrapper and which comprises a main portion struck from its associated panel and foldably joined thereto along a main fold line as well as a web portion defined by a pair of auxiliary divergent fold lines at one end of the main fold line. Thus, when the main body of the tab is swung inwardly along its fold line the web panel is forced into a position which is substantially normal to the panel from which it is struck. In this way an abutment surface for engaging the chimes of the adjacent can is formed which is of substantial length and which thus affords a secure gripping action. In addition, the web panel also causes the can contacting edge of the main portion of the tab to curve inwardly so that a firm increasingly effective holding action is achieved when an outward force tending to force the can out on an end of the wrapper is applied to the can. In accordance with a feature of the invention, substantial economies are effected due to the fact that the top is somewhat longer than the side panels and due to the fact that its end edges are of a complementary configuration to the end edges of the side panels. In this way the top panel is strengthened substantially by using material which in effect is taken from a side wall of an adjacent blank cut from the same sheet of material.

In accordance with one facet of this invention, an improved keel tab is provided for engaging side walls of the middle cans on each side of the keel of the carton so as to hold the cans immediately adjacent to the bottom panel and thereby to add materially to the stability and overall sturdiness of the package.

Figure 2:
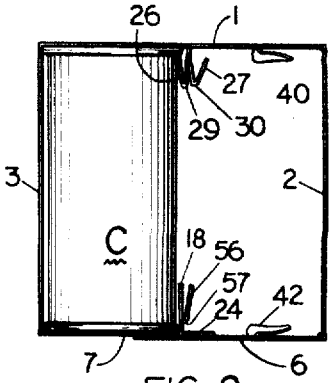
Figure 3:
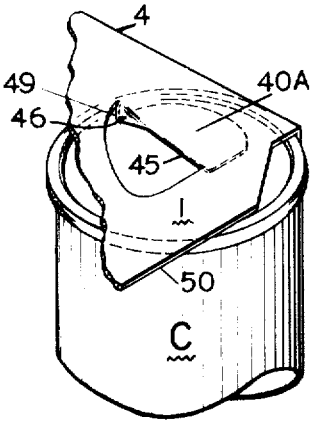
Figure 4:
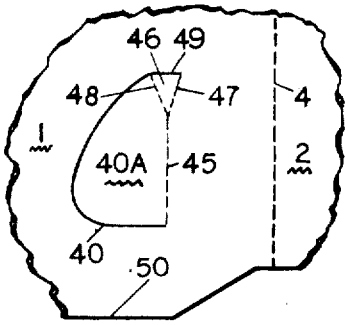
Figure 5:
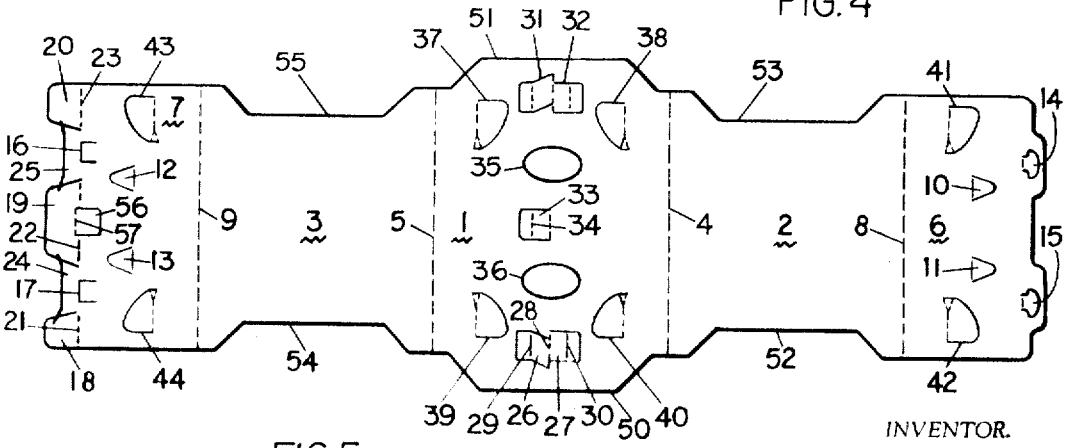

For a better understanding of the invention, reference may be had to the following detailed description taken in conjunction with the accompanying drawings in which FIG. 1 is a perspective view of a wrapper constructed according to this invention and from which the packaged cans have been removed; FIG. 2 is an end view of the wrapper such as is depicted in FIG. 1 and which shows one row of cans packaged but with the other row removed so as to depict one disposition of the improved can retaining tab constructed according to the invention; FIG. 3 is a fragmentary view showing one end can together with its particular cooperation with the improved tab constructed according to this invention and wherein the dimensional relationship between the can edge and the top wall panel of the wrapper is depicted in relation to the outer edge of the end cans; FIG. 4 is an enlarged fragmentary view of a portion of the blank from which the carton is formed and which portion includes the improved tab constructed according to this invention; and in which FIG. 5 is a plan view of a blank from which the wrapper depicted in FIGS. 1 and 2 is formed.

In the drawings numeral 1 depicts the main panel of the wrapper which is referred to herein sometimes as the top panel although it will be understood that the invention is not limited to any particular orientation of the various panels. The numerals 2 and 3 designate the side walls of the panel which are foldably joined respectively to the main top panel along the fold lines 4 and 5. The bottom wall of the carton is a composite panel formed of bottom lap panels 6 and 7 which are foldably joined to the side walls 2 and 3 along the fold lines 8 and 9, respectively.

In order to secure the wrapper about a package group, it is first folded thereabout and then tightened by suitable machine elements which enter the tightening apertures 10 and 11 formed in lap panel 6 and by similar machine elements which enter tightening apertures 12 and 13 formed in lap panel 7. These machine elements move toward each other underneath the package group and secure the wrapper tightly about the cans to be packaged. When the wrapper is tightened its lap panels 6 and 7 are then fastened together.

For the purpose of fastening the lap panels 6 and 7 together a pair of locking tabs 14 and 15 are formed in lap panel 6 and are driven by machine elements through the openings defined by corresponding retaining tabs 16 and 17 formed in lap panel 7.

For the purpose of providing a center keel medially of the package at the bottom thereof, the keel panels designated at 18, 19 and 20 are foldably joined to the lap panel 7 along fold lines 21, 22 and 23. The keel structure and its relationship to the lap panels 6 and 7 and to the other elements of the carton and the blank from which it is struck form no part of the present invention, such structure being disclosed and claimed in U.S. patent application Serial No. 249,903, filed January 7, 1963 by Prentice J. Wood. Interposed between the keel elements 18 and 19 is a reinforcing panel 24 while a similar reinforcing panel 25 is interposed between the keel panels 19 and 20.

For the purpose of holding the top panel 1 in flat contacting relation against the tops of the packaged cans C, can chime engaging tabs 26 and 27 are struck from one end of top panel 1 and are foldably joined thereto along a common coincidental fold line 28. A fold line 29 is formed in tab 26 and a similar fold line 30 is formed in tab 27. In practice the tab 26 is doubled back on itself along the fold line 29 while the tab 27 is doubled back on itself along the fold line 30. These tabs when so folded are disposed between the end cans on opposite sides of the wrapper as best shown in FIG. 2 and the end edges thereof engage the chimes of the adjacent cans and in this way hold the top of panel 1 in contacting relation to the tops of the packaged cans C. The arrangement comprising the tabs 26 and 27 is more fully disclosed and claimed in United States patent appl. Serial No. 209,697, filed July 13, 1962 by Homer W. Forrer.

Disposed at the opposite end of panel 1 are a pair of tabs 31 and 32 which preferably are similar in construction to tabs 26 and 27 and a detailed description thereof is deemed unnecessary.

For engaging the can on one side of the keel of the wrapper intermediate the ends thereof a single can retaining tab 33 is provided. This tab is constructed with a fold line 34 which allows the tab to double back on itself so as to engage the top chime of one can only.

For the purpose of facilitating portability, a pair of finger gripping apertures 35 and 36 are formed in the top panel 1 in known manner.

In accordance with a major feature of this invention, an improved retaining tab is provided such, for example, as is depicted at 37, 38, 39 and 40, such tabs being formed in the top panel 1. Tabs according to the invention are also formed in the lap panel 6 and are designated by the numerals 41 and 42 and in the lap panel 7 and are designated by the numerals 43 and 44. The tabs 37–44 are identical in construction and a detailed description of one tab such as tab 40 is deemed sufficient. As is best shown in FIGS. 3 and 4, tab 40 comprises a main portion 40A which is struck from the top lap panel 1 and which is foldably joined thereto along a main fold line 45. In addition, the tab 40 constitutes a web portion 46 which is disposed at one end of fold line 45 and which is defined by a pair of auxiliary fold lines 47 and 48. Auxiliary fold lines 47 and 48 in reality simply constitute substantially symmetrical bifurcations disposed at one end of the main fold line 45. Thus, as is best shown in FIG. 3 when the tab 40 is folded inwardly along its main fold line 45 the web panel 46 assumes a vertical position substantially normal to the top panel 1. The edge portion 49 of web panel 46 thus constitutes a sturdy abutment ledge of a substantial dimension which directly engages the chime of the adjacent can C. In addition, the adjacent edge of main portion 40A of tab 40 is curved downwardly or inwardly into engagement with the recessed top of the adjacent can. Thus, if a force s applied to the can tending to dislodge it, the edge of main portion 40A of tab 40 is thereby forced more securely toward the can top thus affording added security to the package. While the arrangement depicted in the drawing utilizes tabs such as 37–44 which fold inwardly from the top panel 1 and then outwardly toward the side panels 2 and 3, it will be understood that the invention is not limited to any particular disposition of the main fold line 45 or of the auxiliary fold lines 47 and 48. For example, a satisfactory arrangement is provided wherein the tabs are folded inwardly and toward the center of the carton rather than outwardly toward the side walls. Furthermore, the main fold lines of all the tabs 37–44 are shown in the drawing as being parallel to the side edges such as 4 and 5 of the top panel and 8 and 9 of the bottom panel. It will be understood that the invention is not limited to such a parallel disposition of the main fold line 45.

While the broad principle of nesting wrapper blanks is well known, it is here pointed out that the end edges 50 and 51 of the top panel 1 are configured in a manner which is complementary to the configuration of the end edges 52 and 53, respectively, of the side wall 2 and 54 and 55, respectively, of side wall 3. In this way nesting is made possible and the top panel 1 is made slightly longer so as to strengthen the wrapper in the region adjacent the tabs 26, 27 and 31, 32. Since tabs such as 26, 27, 31 and 32 contribute to the stability of the package and since an area of material must be provided between such tabs and the end edges 50 and 51, it is obvious that the nesting herein disclosed effects substantial savings of material without impairing the strength of the wrapper. Obviously, such added material for the ends of top panel 1 is taken from the ends of the side panels of the blanks which are disposed immediately adjacent a particular blank with respect to the sheet material from which the blanks are die cut. It is apparent that material is thus taken from the blank side walls where it is not needed for mechanical strength and that such material is utilized in the top wall panel where it adds greatly to the strength of the package. It will also be understood that a single tab such as 26 could be used instead of the dual tabs 26 and 27 at the ends of panel 1. Stated otherwise, the tabs such as 33 could be utilized in the outwardly protruding end portions of panel 1 instead of the dual tabs 26 and 27 and dual tabs 31 and 32.

For the purpose of holding the center can on one side of the keel in snug engagement with the bottom panel, an improved keel tab 56 is provided. This tab is struck partially from the keel tab 19 and partially from the lap panel 7 and is foldably joined to the keel tab 19 along fold line 57. Thus, when the package is assembled and with the keel tab 19 disposed vertically the tab 56 is disposed upwardly and in flat engagement with the tab 19. Since the fold line 57 is spaced slightly above the fold line 22 a space is provided for receiving the chimes of the center cans on each side of the tab 19. This space receives and grips the chimes of the center cans and adds an element of sturdiness to the package. Furthermore, since the keel tab 56 is folded flat against the tab 19, a double thickness of material is provided between the body portions of the center cans and in this way added protection is provided. If desired, tabs such as 56 could be formed adjacent the keel tabs 18 and 20.

While a particular arrangement has been shown which utilizes the principles of the invention, it is to be understood that the invention is not limited thereto and that various changes and modifications may be made without departing from the true spirit and scope of the invention.

The embodiments of the invention in which an exclusive property or privilege is claimed are defined as follows:

1. A wrapper for packaging a plurality of articles having recessed ends and whose axes are disposed in substantially parallel relation and whose ends are arranged in common planes, said wrapper comprising generally parallel top and bottom walls interconnected by spaced side walls to form an open-ended tubular structure, said top and bottom walls being arranged for disposition in contacting generally parallel relation to the ends of the packaged articles, and a plurality of tabs struck out of [said top and bottom] *at least one of said parallel* walls and folded inwardly approximately 180 degrees along individual hinge lines and engageable respectively with the ends of the articles disposed at the ends of the wrapper, the hinge lines being bifurcated at one end thereof to define webs which are generally normal to the associated tab for engaging the inner edges of the recessed ends of adjacent articles and for causing the associated tab to curve inwardly toward the adjacent article end thereby to prevent dislodgement thereof through the end of the wrapper.

2. A wrapper for packaging a plurality of articles having recessed ends and whose axes are disposed in substantially parallel relation and whose ends are arranged in common planes, said wrapper comprising generally parallel top and bottom walls interconnected by spaced side walls to form an open-ended tubular structure, said top and bottom walls being arranged for disposition in contacting generally parallel relation to the ends of the packaged articles, and a plurality of tabs struck out of at least one of said parallel walls and foldable inwardly approximately 180 degrees along individual hinge lines and engageable respectively with the recessed ends of the articles, and a web panel [formed at one end of each hinge line and arranged to curve] *foldably joined to each tab and to the associated one of said parallel walls along divergent fold lines so as to project* the associated tab inwardly.

3. A wrapper for packaging two rows of chimed cans having recessed ends and whose axes are disposed in substantially parallel relation and whose ends are arranged in common planes, said wrapper comprising generally parallel top and bottom walls interconnected by spaced side walls to form an open-ended tubular structure, said top and bottom walls being arranged for disposition in contacting generally parallel relation to the ends of the packaged cans, a plurality of tabs struck out of said top and bottom walls and folded inwardly approximately 180 degrees along individual hinge lines and engageable respectively with the ends of the cans disposed at the ends of the wrapper, the hinge lines being bifurcated at one end thereof to define webs which are generally normal to the associated tab for engaging the adjacent can chimes and for curving the associated tabs inwardly thereby to prevent dislodgement of the cans through the end of the wrapper, a medial keel panel secured to said bottom wall and disposed between the rows of cans, and a keel tab struck out of said keel panel and said bottom wall and folded upwardly into parallel relation to said keel panel, said keel tab being arranged for disposition between a pair of cans and being arranged so that its fold line is spaced from said bottom wall and adjacent the chimes of said pair of cans, said keel tab being engageable with said chimes of said pair of cans to hold said bottom wall in close proximity to the adjacent ends of said pair of cans.

4. A blank for forming a wrapper for a plurality of articles to be packaged, said blank comprising a generally rectangular main panel, a pair of side panels foldably joined to the side edges of said main panel, a pair of lap panels foldably joined respectively to the edges of said side panels remote from said main panel, said main panel being longer than said side panels and the end edges of said main panel being of a complementary configuration relative to said side panels whereby the ends of the main panel of a blank may be nested with the ends of the side panels of adjacent blanks during the cutting of blanks from a common sheet of material from which the blanks are formed, and a plurality of tabs formed in said main panel, each of said tabs having a fold line which is bifurcated at one end so as to define a generally triangular shaped web panel.

5. A blank for forming a wrapper for a plurality of articles to be packaged, said blank comprising a generally rectangular main panel, a pair of side panels foldably joined to the side edges of said main panel, a pair of bottom panels foldably joined respectively to the edges of said side panels remote from said main panel, said main panel being longer than said side panels and the end edges of said main panel being of a complementary configuration relative to said side panels whereby the ends of the main panel of a blank may be nested with the ends of the side panels of adjacent blanks during the cutting of blanks from a common sheet of material from which the blanks are formed, a plurality of tabs struck out of said main panel and arranged to engage the ends of the articles at the ends of the wrapper thereby to prevent dislodgement thereof through the ends of the wrapper, and at least one medial tab formed in said main panel and disposed near each end edge thereof and formed at least in part from the portion thereof which nests into the side panel of adjacent blanks, said medial tabs being arranged for disposition between a pair of articles.

6. A wrapper for packaging two rows of chimed cans whose axes are disposed in substantially parallel relation and whose ends are arranged in common planes, said wrapper comprising generally parallel top and bottom walls interconnected by spaced side walls to form an open-ended tubular structure, said top and bottom walls being longer than said side walls and having end edges which are complementary in configuration to the end edges of said side walls, a plurality of chime engaging tabs struck out of said top and bottom walls and foldable along hinge lines which are bifurcated at one end to define generally triangular webs, said webs being generally normal to said top and bottom walls when said tabs are folded approximately 180 degrees into generally parallel relation to said top and bottom walls, a medial keel panel formed on said bottom wall and extending inwardly therefrom, and a keel tab struck out of said keel panel and out of said bottom wall and folded inwardly into parallel relation to said keel panel along a fold line spaced from said bottom wall by a distance approximately the depth of the chimes of the cans to be packaged to form a double thickness medial keel structure.

7. A tab structure adapted to be struck from a panel of an open-ended wrapper and foldable into engagement with the end of a can having a recessed end and disposed in parallel contacting relation to said panel, said tab structure comprising a main portion struck from said panel and foldable along a main fold line through approximately 180 degrees into engagement with the recessed end of an adjacent can, and a web portion defined by auxiliary fold lines and disposed at one end of said main fold line and arranged for normal disposition relative to said panel and to the recessed end of the adjacent can when said main portion is folded through approximately 180 degrees out of the plane of said panel so as to present a sturdy abutment ledge for engagement with the chime of an adjacent can and for causing said main portion to curve inwardly into the recessed end of the adjacent can to prevent movement of the can in one general direction and parallel to the plane of said panel.

8. A tab structure according to claim 7 wherein said web portion is defined by a bifurcated extension of the main fold line for said main web portion at one end thereof which extension comprises a pair of auxiliary fold lines generally symmetrically arranged with respect to said main fold line.

*9. A tab structure struck from a panel of an open-ended wrapper and folded into engagement with the end of a can having a recessed end and disposed in parallel contacting relation to said panel, said tab structure comprising a main portion struck from said panel and folded through approximately 180 degrees into engagement with the recessed end of an adjacent can, and a generally triangular web portion joined by hinge lines to said main portion and to said panel and arranged generally normally relative to said panel and to the recessed end of the adjacent can so as to present a sturdy abutment ledge for engagement with the chime of the adjacent can and for causing a part of said main portion to project inwardly in a manner dependent upon the configuration of said triangular web panel and into the recessed end of the adjacent can to prevent movement of the can in one genetral direction and parallel to the plane of said panel.*

*10. A tab structure struck from a panel of an open-ended wrapper and folded into engagement with the end of a can having a recessed end and disposed in parallel contacting relation to said panel, said tab structure comprising a main portion struck from said panel and foldable through approximately 180 degrees into engagement with the recessed end of an adjacent can, and a web portion joined by diverging hinge lines to said tab and extending to one exposed edge of said tab, said exposed edge of said web portion being arranged generally normally relative to said panel and to the recessed end of the adjacent can so as to present a sturdy abutment ledge for engagement with the chime of the adjacent can and for causing said main portion to project inwardly into the recessed end of the adjacent can to prevent movement of the can in one general direction and parallel to the plane of said panel.*

*11. A wrapper for packing two rows of chimed cans having recessed ends and whose axes are disposed in substantially parallel relation and whose ends are arranged in common planes, said wrapper comprising generally parallel top and bottom walls interconnected by spaced side walls to form an open-ended tubular structure, said parallel walls being arranged for disposition in contacting generally parallel relation to the ends of the packaged cans, a plurality of tabs struck out of at least one of said parallel walls and folded inwardly approximately 180 degrees into engagement respectively with the ends of the cans disposed at the ends of said wrapper, a web forming an integral connection between each of said tabs and said one wall, each said web being defined by hinge lines for the associated said tab arranged in diverging relation to impart a triangular configuration to said web with the base thereof located at one end of the associated said tab, each of said web bases extending generally normally to the associated said tab and the top of the adjacent can for engagement with the adjacent can chime and with the associated said tab in engagement with the adjacent can top whereby the can tops hold said tabs with said web bases preventing dislodgment of the cans through the end of said wrapper.*

*12. An open-end, sleeve-type, wrap-around carrier carton formed from a unitary blank of foldable paperboard for enclosing at least one row of cylindrical objects, such as chimed cans, having on corresponding ends thereof recessed end walls, comprising opposed pairs of parallel walls hingedly interconnected to form a tubular structure for enclosing the ends and sides of the objects; one of the walls enclosing the ends of the objects having, adjacent each open end thereof, a retaining tab attached thereto, on a hinge line and folded through approximately 180° into the carton toward the inner surface of said one wall for disposition within an adjacent recessed end of a packaged object to prevent the object from accidentally moving out of the open end of the carton; and a spacer member foldably connected to said tab and said one wall and operable to urge a portion of said tab into snug, abutting engagement with the recessed end wall of said packaged object; said spacer member being generally triangular in shape having a free end edge defined by a cut line and a pair of side edges defined by a pair of diverging fold lines which connect the member to the retaining tab and one carton wall, respectively.*

*13. In a sleeve-type wraparound, carrier carton for enclosing a plurality of cylindrical articles having chimed, recessed ends, the combination comprising opposed pairs of top and bottom end walls and side walls hingedly attached to form a tubular structure open at the ends; a plurality of can retaining tabs cut from at least one of said end walls and folded inwardly therefrom through approximately 180° to positions adjacent the inner surface of said one end wall for engagement with the recessed ends of adjacent articles to prevent movement of the articles out of the open ends of the tubular structure; each of said tabs having a periphery defined by a first hinge construction and a continuous cut line extending from one end of the hinge construction around the free edge of the tab to the opposite end of the hinge construction; each of said tabs being connected to said one end wall by a generally triangular connecting panel hinged on one edge to said tab along the first hinge construction and hinged on its opposite edge to said one end wall along a second hinge construction; said connecting panel being disposed to extend substantially normal to and between said one wall and said tab to space a part of said tab adjacent one end of said hinge construction inwardly from said wall and thereby urge the latter into firm engagement with the recessed end of said adjacent article.*

References Cited

The following references, cited by the Examiner, are of record in the patented file of this patent or the original patent.

UNITED STATES PATENTS

| | | | |
|---|---|---|---|
| 2,529,725 | 11/1950 | Currie | 220—112 |
| 2,814,385 | 11/1957 | Stone | 206—65 |
| 2,867,320 | 1/1959 | Andre | 206—65 |
| 2,931,492 | 4/1960 | Osterberg | 206—65 |

DONALD F. NORTON, *Primary Examiner.*

JOSEPH R. LECLAIR, *Examiner.*

UNITED STATES PATENT OFFICE

CERTIFICATE OF CORRECTION

Reissue No. 26,339 January 23, 1968

Prentice J. Wood

It is certified that error appears in the above identified patent and that said Letters Patent are hereby corrected as shown below:

Column 7, line 48, strike out "by diverging hinge lines", in italics; same line 48, strike out "tab", in italics, and insert instead -- main portion and to said panel by means including diverging hinge lines --, in italics; line 49, for "tab", in italics, read -- main portion --, in italics.

Signed and sealed this 24th day of June 1969.

(SEAL)
Attest:

Edward M. Fletcher, Jr.
Attesting Officer

WILLIAM E. SCHUYLER, JR.
Commissioner of Patents